United States Patent
Wright et al.

(10) Patent No.: US 8,490,980 B2
(45) Date of Patent: Jul. 23, 2013

(54) SEAL ARRANGEMENT

(75) Inventors: Christopher Wright, Bristol (GB);
Simon D. Granville-George, Bristol (GB)

(73) Assignee: Rolls-Royce PLC, London (GB)

( * ) Notice: Subject to any disclaimer, the term of this patent is extended or adjusted under 35 U.S.C. 154(b) by 1003 days.

(21) Appl. No.: 12/382,851

(22) Filed: Mar. 25, 2009

(65) Prior Publication Data

US 2009/0322028 A1 Dec. 31, 2009

(30) Foreign Application Priority Data

Jun. 30, 2008 (GB) .................................. 0811867.1

(51) Int. Cl.
*F16J 15/447* (2006.01)
*F01D 11/02* (2006.01)

(52) U.S. Cl.
USPC ........................................................... 277/355

(58) Field of Classification Search
USPC ........................................................... 277/355
See application file for complete search history.

(56) References Cited

U.S. PATENT DOCUMENTS

| 5,318,309 | A | 6/1994 | Tseng et al. | |
| 6,565,094 | B2 * | 5/2003 | Wright et al. | 277/355 |
| 6,786,487 | B2 * | 9/2004 | Dinc et al. | 277/355 |
| 7,021,631 | B2 * | 4/2006 | Wright et al. | 277/355 |
| 7,249,769 | B2 * | 7/2007 | Webster | 277/411 |
| 2003/0102630 | A1 | 6/2003 | Dinc et al. | |
| 2003/0178779 | A1 * | 9/2003 | Wright et al. | 277/355 |
| 2008/0136112 | A1 * | 6/2008 | Addis | 277/355 |
| 2008/0265514 | A1 * | 10/2008 | Mortzheim | 277/303 |

FOREIGN PATENT DOCUMENTS

EP    1 876 379 A2    1/2008

\* cited by examiner

*Primary Examiner* — Gilbert Lee
(74) *Attorney, Agent, or Firm* — Oliff & Berridge, PLC

(57) ABSTRACT

A seal arrangement (1, 101) for maintaining an axial pressure differential between relative high and low pressure stages along a rotating element (2, 102), the arrangement comprising:
i) a plurality of leaf or brush seal members (5) forming a circumferential seal-pack (4, 104) around the rotating element (2, 102), in-between said low and high pressure stages, for limiting leakage of fluid between said low and high pressure stages;
ii) a baffle (6, 7, 106, 107) positioned on the upstream or downstream side of the seal-pack (4, 104) for regulating such leakage through the seal pack (4, 104); and
iii) a control arrangement for adjusting the position of the baffle (6, 7, 106, 107) hereby to control the regulation of said leakage through the seal-pack (4, 104) and hence control the consequent blow-down effect on the seal-pack (4, 104) caused by that leakage.

10 Claims, 6 Drawing Sheets

SEAL ARRANGEMENT

The present invention relates to a seal arrangement for maintaining an axial pressure differential between relatively low and high pressure stages along a rotating element, for example operational stages in a gas turbine.

It is often desired to provide a circumferential seal around a rotating element in order to maintain an axial pressure differential along the rotating element, for example to separate operational stages in a gas turbine; both brush-seals and leaf-seals are conventionally used for this purpose.

Brush-seals and leaf-seals rely on a radially-compliant "seal-pack" to provide an effective circumferential seal around the respective rotating element whilst at the same time accommodating a degree of eccentricity in the rotation of the rotating element.

In the case of a brush-seal, the seal-pack comprises an annulus of closely-packed, flexible metal or ceramic bristles which are typically secured at their root to an outer casing surrounding the rotating element and extend inwardly towards the rotating element from the outer casing, spanning the annular gap between the outer casing and the rotating element. The necessary seal is provided by the tips of the bristles, which typically "wipe" across the surface of the rotating element, whilst eccentric rotation of the rotating element is accommodated to a degree by radial flexing of the bristles.

In leaf-seals, the seal-pack comprises a plurality of axially-stiff, generally flat leaves or tabs, rather than bristles, which extend inwardly towards the rotating element from a respective outer casing with their respective inner edge generally aligned along the axial direction. In similar manner to the bristles in a brush-seal, the inner edges of the leaves typically "wipe" across the rotating element to effect the required seal and eccentric rotation of the rotating element is accommodated to a degree by radial flexing of the leaves. At the same time, the axial-stiffness of the leaves advantageously makes them less susceptible than bristles to excessive axial bending.

Whilst the seal-pack in a typical brush-seal or leaf-seal is generally effective in forming an annular barrier between the high and low pressure sides of the seal, a certain amount of leakage of fluid (typically air) may occur through the body of the seal-pack, in-between the closely-packed bristles or leaves. Flow of fluid through the seal-pack tends to exert a fluid-dynamic force on the individual bristles or leaves in the seal-pack and, depending upon the principal direction of leakage flow one may observe seal "blow-down", where the seal pack is forced radially inwardly against the rotating element, or seal "blow-up", where the seal-pack tends to be lifted radially outwardly away from the rotating element.

Conventionally, the geometry of the seal assembly is designed either to promote seal blow-down or, alternatively, seal blow-up. There is thus normally a trade-off between the rate of wear of the seal (which will tend to be increased in a blow-down configuration) and the rate of leakage through the seal (which will tend to be increased in a blow-up configuration).

It is an object of the present invention to seek to provide an improved seal arrangement for maintaining an axial pressure differential between relatively low and high pressure stages along a rotating element.

According to the present invention there is provided a seal arrangement for maintaining an axial pressure differential between relative high and low pressure stages along a rotating element, the arrangement comprising: a plurality of leaf or brush seal members forming a circumferential seal-pack around the rotating element, in-between said low and high pressure stages, for limiting leakage of fluid between said low and high pressure stages; a baffle positioned on the upstream or downstream side of the seal-pack for regulating such leakage through the seal pack; and a control arrangement for adjusting the position of the baffle thereby to control the regulation of said leakage through the seal-pack and hence control the consequent blow-down effect on the seal-pack caused by that leakage.

The seal arrangement may further comprise a second baffle positioned on the opposite side of the seal-pack. The baffles may be arranged in fixed relation to one another or arranged for movement independently of one another.

In one embodiment, the control arrangement is responsive to differential pressure across the seal, between the low and high pressure stages.

The, or each, baffle may be arranged for axial movement along the rotating element, relative to the seal pack, in order to adjust the position of the baffle. Additionally or alternatively the, or each, baffle may be arranged for radial movement, relative to the seal-pack, in order to adjust the position of the baffle.

In one embodiment the, or each, baffle is an adjustable iris diaphragm, which may be continuously adjustable between an open and a closed position.

The control arrangement may comprise a differential pressure sensor, for measuring the differential pressure between said low and high pressure stages, and an actuator for driving the or each baffle in response to said measurement of differential pressure.

The control arrangement may comprise a sensor for detecting the rotational speed of the rotating element and an actuator for driving the, or each, baffle in response to said measurement of rotational speed.

Alternatively, the control arrangement may comprise a piston for driving the baffle against the action of a biasing member thereby to adjust the position of the baffle, the piston being driven by fluid pressure on the high pressure side of the seal-pack.

In one embodiment, the control arrangement is configured for adjusting the or each baffle between a first position, in which the or each baffle promotes a blow-down effect on the seal pack, and a second position, in which the or each baffle promotes a blow-up effect on the seal-pack.

The rotating element may be a rotor, which may in turn be provided in a gas turbine.

According to a further aspect of the present invention there is provided a method of operating a seal arrangement according to the present invention, the method comprising: positioning the or each baffle for promoting a blow-down effect on the seal-pack at a relatively low engine power; and adjusting the position of the baffle at a relatively high engine power thereby to reduce said blow-down effect.

The step of adjusting the, or each, baffle at relatively high engine power may comprise adjusting the, or each, baffle to promote a blow-up effect.

Embodiments of the invention will now be described in more detail, by way of example, with reference to the accompanying drawings in which:

FIG. 1 shows a seal arrangement 1 for maintaining an axial pressure differential between high ($P_1$) and low ($P_2$) pressure stages along a rotating element, in this case a rotor shaft 2.

In this specification, the term "axial" is intended to refer to the principal flow direction through the seal and "radial" is intended to refer to a direction perpendicular to the aforementioned flow direction.

Figure 1:
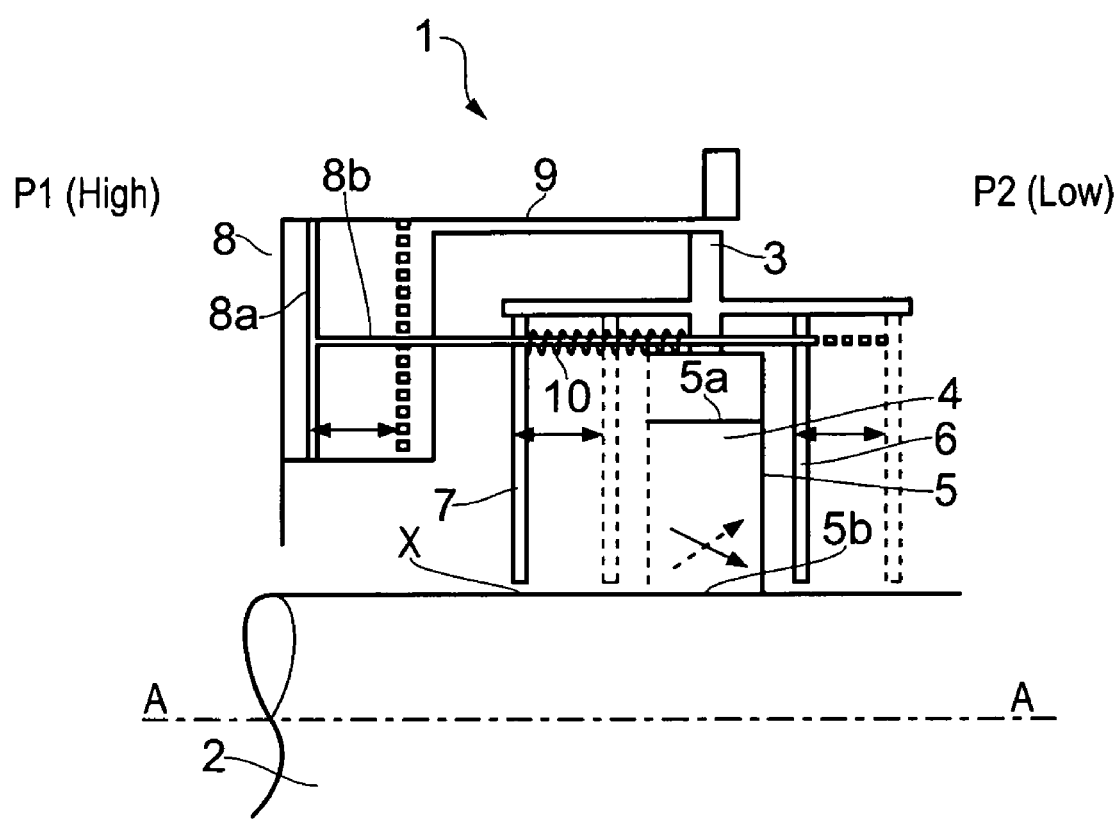
FIG. 1 is a cross sectional, schematic view showing a seal arrangement.

The seal arrangement 1, which it should be noted is shown only schematically in FIG. 1, comprises an annular support member 3, fixed to an outer rotor casing (not shown) surrounding the rotor shaft 2, and an annular seal-pack 4 extending inwardly from the support member 3 towards the rotating element 2.

The seal-pack 4 is a conventional leaf seal-pack comprising a plurality of flexible leaves 5 (of which only one is visible in FIG. 1) fixed at their respective root 5a to the support member 3 and having a free, axially-aligned inner edge 5b which in this case "wipes" against the rotating element 2 to effect a dynamic circumferential seal around the rotating element 2 and limit axial flow between the high and low pressure stages on either side of the seal. The seal-pack might alternatively define a circumferential gap around the rotating element 2 which is nevertheless sufficiently small to promote an effective seal between the seal-pack and the rotating element.

Although not explicitly illustrated in FIG. 1, it will be appreciated that the leaves 5 are presented at a lay-angle to the rotating element 2, in conventional manner, so that the free, sealing edge of each leaf 5 advantageously trails the corresponding root in the direction of rotation of the rotating element 2.

An annular, radial baffle 6 is positioned downstream of the seal-pack 4 with the inner diameter of the baffle 6 defining a circumferential clearance gap x around the outside of the rotating element 2. The baffle 6 is slidably mounted on the support member 3 for axial sliding movement along the axis of rotation A, relative to the seal-pack 4.

A corresponding annular radial baffle 7 is positioned upstream of the seal-pack 4, the baffle 7 likewise defining a clearance gap x around the outside of the rotating element 2 and being slidably mounted on the support member 3 for axial sliding movement along the axis of rotation A.

An actuator is provided, in the form of a piston 8, for adjusting the position of the baffles 6, 7 relative to the outer casing.

The piston 8 incorporates a piston rod 8b fixedly connected to each of the baffles 6, 7 and a piston head 8a which is slidably received in an open-ended, axial cylinder 9 extending through the support member 3 between the high and low pressure sides of the seal (the cylinder 9 is illustrated in very schematic terms in FIG. 1 for the purposes of clarity). The piston 8 is thus driven by a pressure differential across the ends of the cylinder 9, which will correspond to the pressure differential between the high pressure and low pressure sides of the seal.

The piston 8 moves inside the cylinder 9 against the action of a biasing member, in this case a compression spring 10 acting between the baffle 7 and the supporting member 3. Thus, for a given differential pressure between the high pressure and low pressure sides of the seal the piston 8, and consequently the baffles 6, 7, will adopt an equilibrium position largely predetermined by the spring constant for the spring 10 and the effective area of the piston head 8a. As the differential pressure across the seal varies, so this equilibrium position will vary.

Figure 2A:
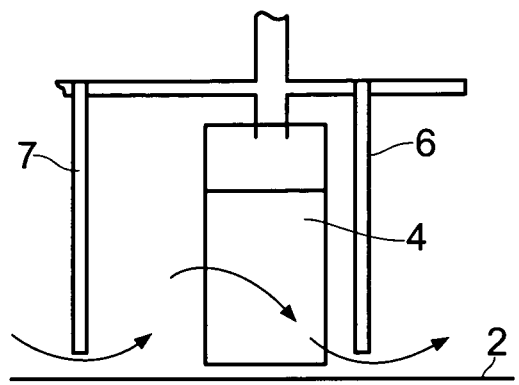
FIG. 2a is a simplified, cross-sectional, schematic view corresponding to FIG. 1, illustrating the seal arrangement in a first configuration.
Figure 2B:
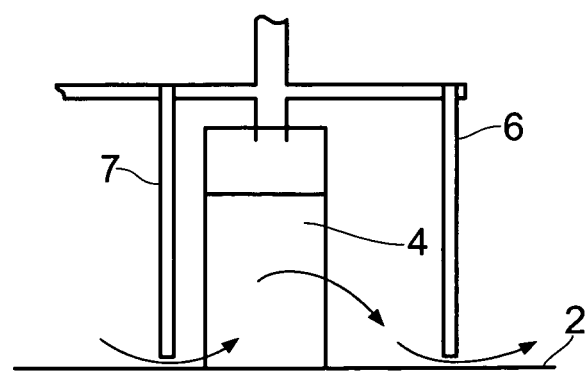
FIG. 2b is a cross-sectional, schematic view corresponding to FIG. 2a, but illustrating the seal arrangement in a second configuration.
Figure 3:
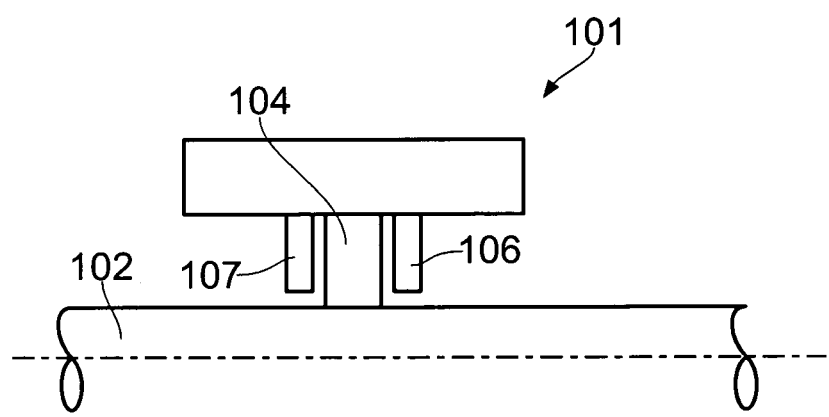
FIG. 3 is a cross-sectional view of a further seal arrangement.

The effect of adjusting the baffles 6, 7 is shown in FIGS. 2a and 2b, which omit the piston 8, cylinder 9 and spring 10 simply for the purposes of clarity.

In FIG. 2a, there is a relatively low differential pressure across the seal, as might occur for example in a gas turbine application at a low engine setting. Here, the equilibrium position of the piston 8 is such that the baffle 6 is positioned in close proximity to the downstream side of the seal-pack 4, the baffle 7 is positioned relatively remote from the upstream side of the seal-pack 4 and consequently the baffles 6, 7 promote a blow-down effect on the seal-pack 4, as indicated by the arrows in FIG. 2a depicting leakage flow through the seal pack.

In FIG. 2b, there is a relatively high differential pressure across the seal, as might occur for example in a gas turbine application at a high engine setting. Here, the equilibrium position of the piston 8 is such that the baffle 6 is positioned relatively remote from the downstream side of the seal-pack 4, the baffle 7 is in close proximity to the upstream side of the seal-pack 4 and consequently the baffles 6, 7 promote a blow-up effect on the seal-pack 4, as indicated by the arrows in FIG. 2b. This equilibrium position of the piston 8 and baffle plates 6, 7 in FIG. 2a is also illustrated in phantom in FIG. 1.

Thus, the piston 8 is responsive to the differential pressure in order to adjust the baffles 6, 7 for varying the blowdown effect on the seal-pack 4.

Turning to FIGS. 3 to 6d, an alternative seal arrangement 101 is shown which comprises an alternative baffle design.

The seal arrangement 101 comprises a downstream baffle 106 and an upstream baffle 107 either side of the seal-pack 104.

Figure 4A:
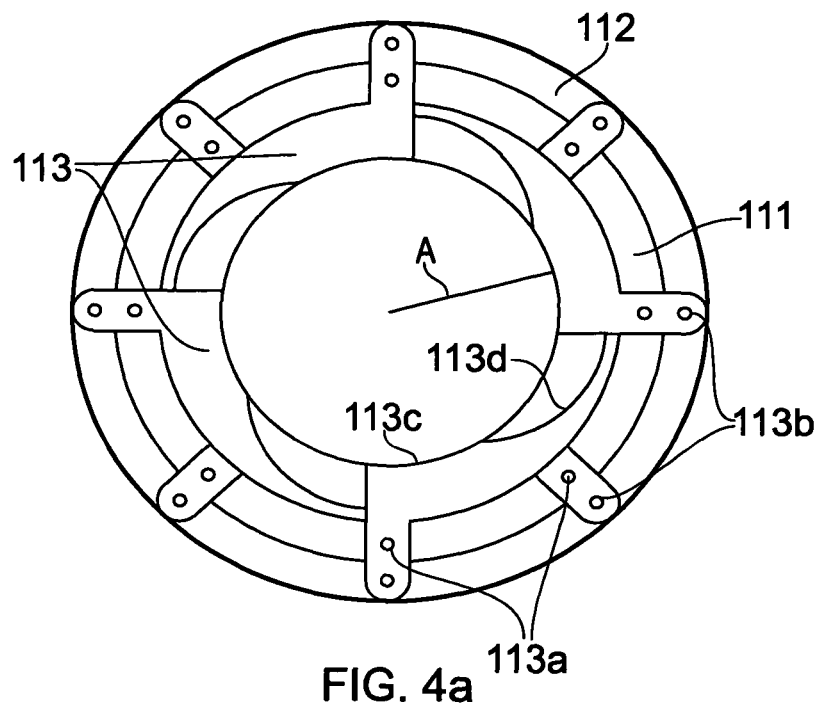
FIG. 4a is an end-on axial view showing part of the seal arrangement of FIG. 3 in an "open" position.
Figure 4B:
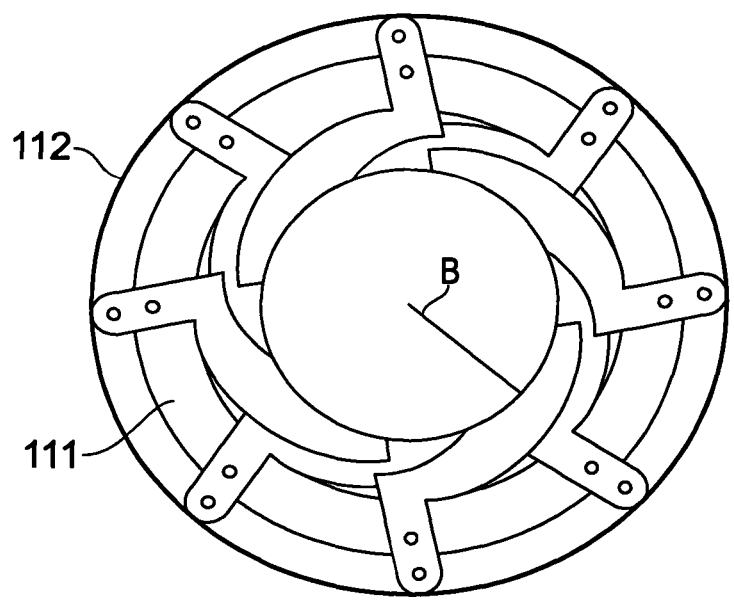
FIG. 4b is an end-on axial view showing part of the seal arrangement of FIG. 3 in a "closed" position.

Each of the baffles 106, 107 is in the form of an adjustable iris diaphragm shown in isolation in FIGS. 4a and 4b, comprising a pair of concentric, relatively rotatable actuator rings 111, 112 and two circumferential rows of iris elements 113.

Each of the iris elements 113 is pivoted to one of the actuator rings, in this case the inner actuator ring 111, at a pivot point 113a and further comprises a key 113b which is slidably guided in a corresponding radial key-way (not shown in FIGS. 4a and 4b) in the other actuator ring, in this case the outer actuator ring 112. The inner edge of each iris element 113 defines a first circular-arced portion 113c having a radius, A, and a second circular-arced portion 113d having a smaller radius, B (see FIG. 4b).

It will be appreciated that as the actuator rings 111, 112 are rotated relative to one another, the iris elements 113 will be forced to pivot about the pivot points 113a, with radial sliding movement of the respective keys 113b accommodating the consequent change in the radial position of the keys 113b relative to the pivot points 113a. In this manner, each of the baffles 106, 107 can be adjusted between a first position, shown in FIG. 4a, in which the circular-arced portions 113c are in a first configuration and define a circular aperture of radius A, and a second position, shown in FIG. 4b in which the circular-arced portions 113c are in a second configuration and form a circular aperture of smaller radius, B. Each baffle 106, 107 is therefore effectively retractable from a closed position (defining an aperture of radius B around the rotating element 102) to an open position (defining a central aperture of larger radius, A, around the rotating element 102) in order to adjust the baffle 106, 107.

The respective control arrangement for controlling the baffles 106, 107 may comprise a motor (not shown) or some other actuator operably connected to one of the actuator rings 111, 112 for rotation of that actuator ring relative to the other actuator ring. For example, a motor may be operably coupled to the outer actuator ring 112 and the inner actuator ring may then be fixed with respect to the outer ring, for example by fixing to the rotor casing (not shown). The relevant actuator may be linked to the relevant actuator ring 111, 112 by any suitable series of gears, levers or linkages. A common actuator may be used for both baffles 106, 107 or the baffles 106, 107 may be driven by separate actuators.

The actuator may drive rotation of the relevant actuator ring 111, 112 in response to a differential pressure measured by a differential pressure sensor, which may comprise an upstream pressure sensor and a downstream pressure sensor. Alternatively, the actuator may drive the relevant actuator ring in response to a sensor-based measurement of the rotation speed of the rotating element 102.

Figure 5:
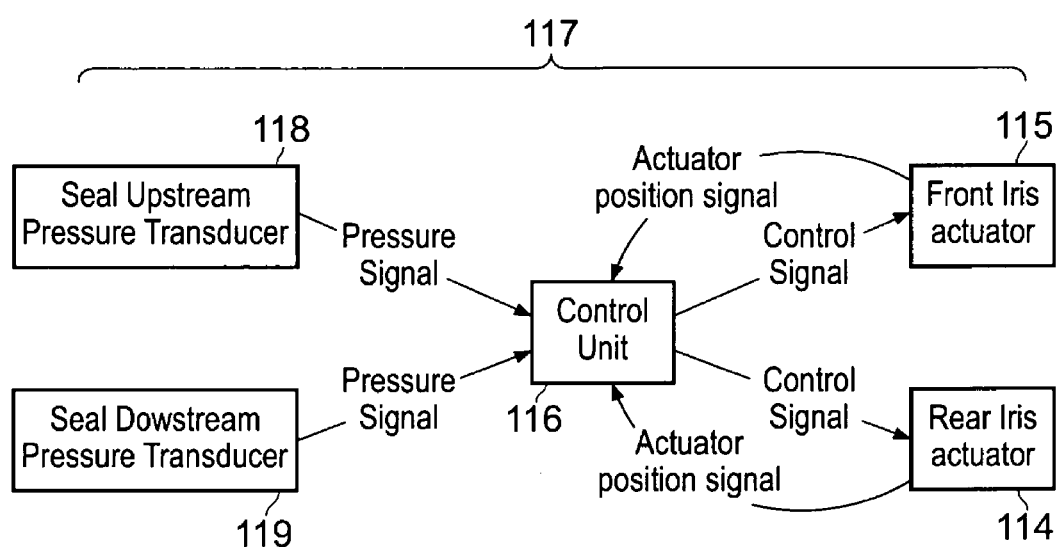
FIG. 5 is a schematic diagram showing a control loop for the seal arrangement in FIG. 3.

A suitable feedback control loop may be used to control each actuator. FIG. 5 shows one possible control loop 117 for controlling respective separate actuators 114, 115 associated with the baffles 106, 107. The control loop 117 comprises inputting sensor signals (in this case upstream and downstream pressure signals) from sensors 118, 119 to a control unit 116, and using the control unit 116 to determine a suitable control signal for each actuator 114, 115 on the basis of the inputted sensor signals and a respective feedback signal indicating the current position of the baffle 106, 107. The control unit 116 may determine the control signals using a suitable pre-stored algorithm, based on a predetermined, desired seal characteristic.

The baffles 106, 107 are arranged for movement independently of one another so that they may be independently adjusted. FIGS. 6a to 6d, show various relative positions for the baffles 106, 107.

Figure 6A:
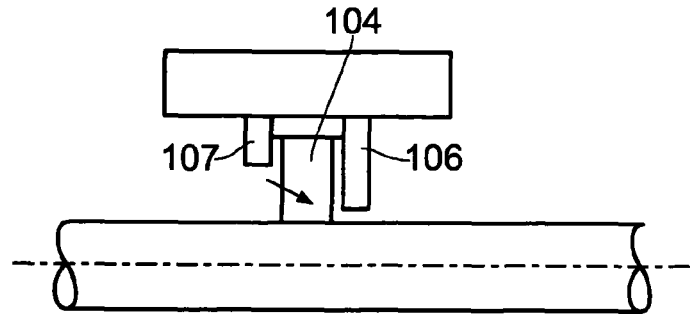
FIGS. 6a-6d are cross sectional views corresponding to FIG. 3 but showing the arrangement in four alternative configurations.

In FIG. 6a, the baffle 107 is in a fully retracted (open) position and the baffle 106 is in a fully extended (closed) position. Here, the principal leakage flow through the seal pack 104 is downward towards the base of the baffle 106, as indicated by the arrows, thus creating maximum blow-down effect on the seal pack 104.

Figure 6B:
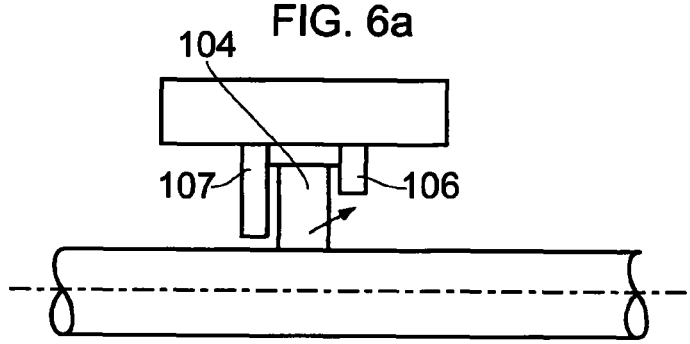

In FIG. 6b, the baffle 107 is in a fully extended (closed) position and the baffle 106 is in a fully retracted (open) position. Here, the principal leakage flow through the seal-pack 104 is upwards away from the base of the baffle 107, as indicated by the arrows, thus reducing the blow-down effect on the seal-pack 104 and, specifically, creating maximum blow-up effect on the seal pack 104.

Figure 6C:
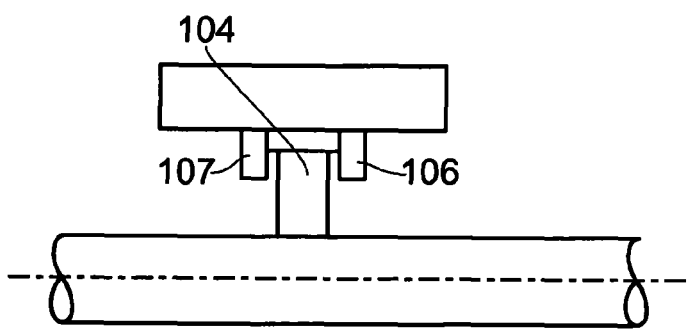

In FIG. 6c, both of the baffles 106, 107 are in the fully retracted (open) position. Here, the principal leakage flow will be directed parallel to the rotating element 102, and the position of the baffles 106, 107 may thus be considered to be neutral, in the sense that they promote neither a blow-down nor a blow-up effect on the seal-pack 104. Nevertheless, the leakage cross-section will be maximised due to the relatively large exposed area of the seal pack 104.

Figure 6D:
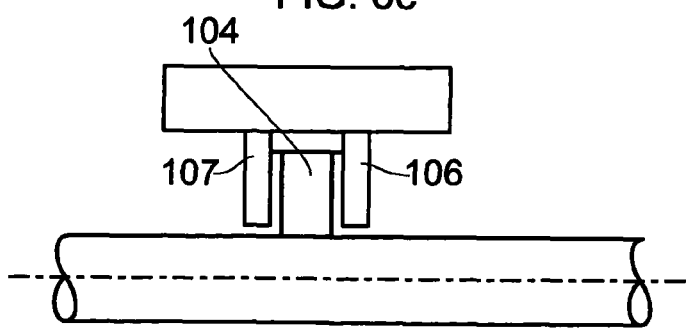

In FIG. 6d, both of the baffles 106, 107 are in the fully extended (closed) position. Here, the principal leakage flow will again be directed parallel to the rotating element 102, so that the baffles 106, 107 are in a neutral position, but the leakage cross-section will be minimised.

It will be appreciated that by adjusting the position of the baffles 106, 107 the blow-down effect caused by leakage flow through the seal-pack 104 can be controlled. For example, in the case of a gas turbine application, the baffles 106, 107 may be adjusted to the position shown in FIG. 6a at a relatively low engine power, and then adjusted to the position in FIG. 6b, 6c or 6d at a relatively high engine power.

In addition, independent radial adjustment of the baffles 106, 107 allows for a degree of independent control of the differential pressure across the seal-pack 104, which it is envisaged may allow control of bearing loads.

Any suitable iris diaphragm design may be used for each baffle other than the specific arrangement shown in FIGS. 4a and 4b, including arrangements allowing for continuous adjustment of the baffles between the open and closed position.

Similarly, any suitable control arrangement may be used for adjusting the position of the baffles. In particular it is envisaged that instead of, or as well as, a piston arrangement, the embodiment shown in FIG. 1 might equally utilise one or more actuators (such as motors), which may be driven either in response to a differential pressure measured by a pressure sensor or a sensor-based measurement of the rotation speed of the rotating element. Similarly, the embodiment shown in FIG. 3 might additionally or alternatively utilise a piston arrangement as part of the control arrangement for adjusting the baffles.

It will be appreciated that a single seal arrangement according to the present invention also allows for flexible pre-adjustment of the position of the baffle plates, prior to operation of the rotating element for a given operating period, even where the position of the baffle plates is then subsequently fixed for the remainder of the operating period (for example to provide a pre-determined desired blow-down effect at a given optimal differential pressure or rotation speed).

In an alternative embodiment (not shown) the baffles may be adjustable both in the radial direction and in the axial direction, either independently or concurrently. Where independent radial and axial adjustment is required, the control arrangement may utilise separate adjustment mechanisms for axial and radial adjustment; for example, the control arrangement may utilise a piston arrangement similar to that in FIG. 1 for axial adjustment, and an actuator-driven iris diaphragm arrangement similar to that in FIG. 3 for radial adjustment.

The invention claimed is:

1. A seal arrangement for maintaining an axial pressure differential between relative high and low pressure stages along a rotating element, the arrangement comprising:
    a plurality of leaf or brush seal members forming a circumferential seal-pack around the rotating element, in-between said low and high pressure stages, for limiting leakage of fluid between said low and high pressure stages;
    a first baffle positioned on the upstream side of the seal-pack and a second baffle positioned on the downstream side of the seal-pack for regulating such leakage through the seal pack; and
    a control arrangement for adjusting the position of the first and second baffles to control the regulation of said leakage through the seal-pack and hence control the consequent blow-down effect on the seal-pack caused by that leakage,
    wherein the first and second baffles are axially movable in a fixed relation to one another.

2. A seal arrangement according to claim 1, wherein the baffles are arranged for axial movement along the rotating element, relative to the seal pack, in order to adjust the position of the baffles.

3. A seal arrangement according to claim 1, wherein the control arrangement is responsive to differential pressure across the seal, between the low and high pressure stages.

4. A seal arrangement according to claim 3, wherein the control arrangement comprises a differential pressure sensor, for measuring the differential pressure between said low and high pressure stages, and an actuator for driving the baffles in response to said measurement of differential pressure.

5. A seal arrangement according to claim 3, wherein the control arrangement comprises a piston for driving the baffles against the action of a biasing member thereby to adjust the position of the baffles, the piston being driven by fluid pressure on the high pressure side of the seal-pack.

6. A seal arrangement according to claim 1, wherein the control arrangement comprises a sensor for detecting the rotational speed of the rotating element and actuator for driving the baffles in response to said measurement of rotational speed.

7. A seal arrangement according to claim 1, wherein the control arrangement is configured for adjusting the baffles between a first position, in which the baffles promote a blow-down effect on the seal pack, and a second position, in which the baffles promote a blow-up effect on the seal-pack.

8. A gas turbine engine including a rotating element and a seal arrangement according to claim 1.

9. A method of operating a seal arrangement within a gas turbine engine according to claim 8, the method comprising:
    positioning the baffles for promoting a blow-down effect on the seal-pack at a relatively low engine power; and
    adjusting the position of the baffles at a relatively high engine power thereby to reduce said blow-down effect.

10. A method according to claim 9, wherein adjusting the position of the baffles comprises adjusting the baffles, to promote a blow-up effect.

* * * * *